Aug. 5, 1969     J. L. HILL     3,459,378
LOAD CONTROL SYSTEM
Filed Oct. 13, 1965
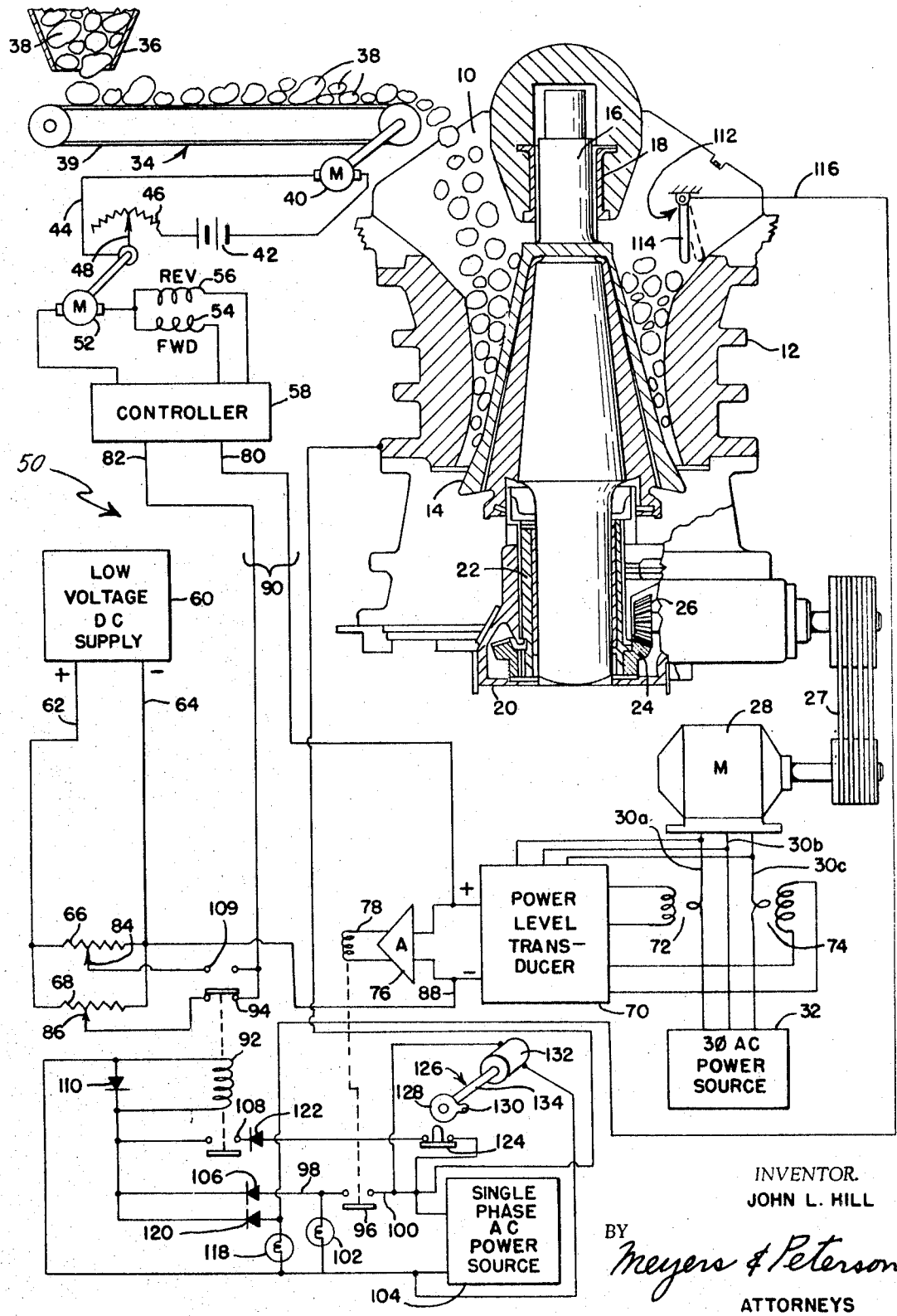
INVENTOR.
JOHN L. HILL
BY Meyers & Peterson
ATTORNEYS

United States Patent Office 3,459,378
Patented Aug. 5, 1969

3,459,378
LOAD CONTROL SYSTEM
John L. Hill, North St. Paul, Minn., assignor to Ramsey Engineering Company, St. Paul, Minn., a corporation of Minnesota
Filed Oct. 13, 1965, Ser. No. 495,536
Int. Cl. B02c 25/00
U.S. Cl. 241—35                                17 Claims

ABSTRACT OF THE DISCLOSURE

A conveyor feeds rock to a crusher, the crusher motor being able to withstand a lower load level on a continuous basis and a higher load level for temporary periods of operation. A first potentiometer establishes a minimum speed of the conveyor whereby material is fed at a lower rate which rate is acceptable for continuous operation of the crusher and a second potentiometer similarly establishes a maximum conveyor speed whereby material is fed at a higher rate which rate is unacceptable for continuous operation but acceptable for short operational periods. A sensor determines when the unacceptable state is reached and causes a relay to be energized which switches the control from the second potentiometer to the first potentiometer which causes the feed rate to be gradually decreased or lowered, this being in the direction of the acceptable or continuous state of operation. However, a timer periodically deenergizes the relay with the consequence that the control is returned to the second potentiometer irrespective of whether the unacceptable condition has been eliminated. When the unacceptable condition or state returns or if it has not been eliminated, the sensor causes the relay to be immediately energized again and it will remain energized until the timer again deenergizes it, such action resulting in an average material feed rate that is between the acceptable and unacceptable operational states.

---

This invention relates generally to load control systems, and pertains more particularly to a system for adjusting the amount of feed stock that is delivered into a crusher.

In the process of feeding rock or ore to be crushed into a crusher, the amount which can be crushed per unit time (usually tons per hour) depends both on the character of the material being crushed and the state of wear of the crusher. The amount that can be handled is further dependent upon the maximum energy output of the electric driving motor that can be maintained for specified intervals. Control suitable for adjustment of the quantity of incoming material may typically be of a conventional design and employ measured electrical input to the driving motor as its dependent or controlled variable. However, the actual control is effected via adjustment of the amount of material which is delivered into the crusher per unit time. Such a controller will vary the speed of operation of some conventional feeding device, such as a belt or pan feeder, and attempt by its control capability to maintain the electrical input to the crusher at some prescribed level, this level usually being termed the "set-point" of the controller.

The above-alluded to operation at an arbitrarily established set-point fails to protect the crusher from becoming plugged by an excessive amount of feed. Also, the reliance upon an arbitrarily established set-point further fails to take advantage of the inherent property of the electric drive motor to accept appreciable overloads for moderately short intervals, thereby unduly limiting the amount of product that can be obtained from the crusher than if the ability of the motor to handle intermittent overloads is fully exploited. Furthermore, an arbitrarily selected set-point may be appreciably less than the crusher can produce due to the apprehension of the operating personnel in the direction of erring on the safe side; in other words, the person making the selection is apt to adopt a liberal margin to insure against variations of either the rate of feed of the incoming material or a crusher condition that might result in some undesirable effect that could be blamed on the operating personnel and such personnel is usually anxious to avoid such blame.

Accordingly, one object of the invention is to provide a load control system that will permit the load device to operate at or to accept appreciable overloads for relatively short periods of time. Stated somewhat differently, when a limiting condition occurs, corrective action then takes place automatically when practicing my invention. For example, the limiting condition might represent a power level so high that continued operation of the electric drive motor of a crusher at this level would result in damage to the motor. On the other hand, the limiting condition might be the level of feed material at the entrance to the crusher which level would be capable of interfering with the free movement of some important part of the feeding device or other portion of the feed system.

Another object of the invention is to allow the system to attempt to return to its higher load restriction at periodic intervals in order to increase the product output if the limiting conditions has disappeared. In other words, the system envisaged by the present invention repeatedly checks for the purpose of ascertaining whether the adverse condition has been removed and if so to allow the system to resume its operation at some power level intermediate the maximum condition and the lowered level to which it has been forced to operate at due to the encountering of a maximum or limiting condition previously.

Quite briefly, the present invention employs two potentiometers, one being set to a voltage representative of an input power condition considered safe for the crusher drive motor under all anticipated conditions and the other being set for a voltage representative of a level of power to the crusher drive motor slightly in excess of any maximum expected condition, such maximum condition being of a magnitude that would in all likelihood cause damage to the drive motor if maintained for any protracted interval. Since it is contemplated that the maximum expected condition may come from either of two sources when the invention is utilized in conjunction with the controlling of crusher equipment, it is planned that when the power delivered to the drive motor reaches a predetermined magnitude that a set of normally open contacts will immediately be closed to cause the controller to receive its "instructions" from the lower one of the two potentiometer settings, which was selected to provide safe operating power level under all anticipated condtions. The second possibility stems from the crusher receiving an excessive amount of rock or ore to be crushed and in this instance a set of contacts would be closed when the amount of feed stock reaches a predetermined level in the crushing equipment. Either of the normally open set of contacts when closed by the particular event being experienced for which these sets of contacts are assigned to control will cause the first-mentioned potentiometer to exercise its supervisory control. This causes the feeding apparatus to reduce the amount of rock or ore that is being delivered into the crusher with a concomitant reduction in the load imposed upon the crusher drive motor. Inasmuch as any maximum condition that is encountered is likely to be of brief duration, the invention provides for the return to the control exercised by the second potentiometer at periodic intervals. Consequently, the set-point delivered to the controller continually oscillates between the two provided by the separate potentiometers, one being essentially too low, and the other being essentially too high. Since the controller cannot make instantaneous changes to the feed rate of material entering the crusher, in attempting to follow this square-wave form of set-point input, it produces a fluctuating level of material feed rate operation which seldom reaches either of the two selected levels corresponding to the potentiometer settings, but averages at a value in between them such that it approaches the higher level a greater portion of the time when the adverse conditions are incurred less frequently. From the foregoing, it will be appreciated that in my invention will find utility in situations where relatively brief peak load conditions are encountered.

These and other objects and advantages of my invention will more fully appear from the following description, made with the accompanying drawing, wherein like reference characters refer to the same or similar parts throughout the several views and in which:

The single figure that has been selected for exemplifying my load control system consists of a schematic circuit shown in association with diagrammatically depicted crushing equipment together with the feeder for supplying the crushing equipment with rock or ore.

Referring now in detail to the drawing, the load device that has been selected for illustrating the invention constitutes a gyratory crusher denoted generally by the reference numeral 10. It will be understood that the crusher 10 is only exemplary and may be of any conventional form. The crusher 10 is more fully described in "The Handbook of Mineral Dressing" by Arthur F. Taggart, published by John Wiley & Sons, New York, seventh printing in June 1960. A detailed description of this form of crusher appears on pages 4–40 and 4–41 of this publication, with an illustration being shown as FIGURE 36 on pages 4–41. However, for the sake of completeness at this moment, the salient or most important elements of which the crusher 10 is constructed will be mentioned. In this regard, the crusher 10 comprises an outer cone or housing 12 and an inner cone or mantle 14. A shaft 16 extends through the inner cone 14, the upper end being received in a loose bearing 18. The bottom of the shaft 16 is rounded and is supported on a horizontal surface labeled 20, such surface in practice being the upper end of a piston that can be adjusted upwardly to compensate for wear of the inner cone 14. An eccentric member 22 encircles the lower portion of the shaft 16. Circumscribing the periphery of the eccentric 22 is a beveled ring gear 24 which meshes with a pinion 26. The lower end of the shaft 16 is loosely received in the eccentric 22 so as to be oscillated as the eccentric is rotated by the pinion.

For the purpose of rotating the pinion 26, a conventional belt and pulley drive 27 is used, a three-phase squirrel-cage induction motor 28 providing the motive power, this being the type of motor generally employed for operating crushing equipment. To supply power to the motor 28 are three power lines 30a, 30b and 30c. Since the motor 28 is a three-phase motor, the source of power which has been assigned the reference numeral 32 is, of course, a three-phase power source.

At this time, attention is directed to a feeder denoted generally by the reference numeral 34. Surmounting one end of the feeder 34 is a hopper 36 containing a supply of rock or ore 38 that is to be crushed in the crusher 10. In order to convey the rock or ore 38 from the hopper 36 to the crusher 10 is an endless belt conveyor 39 having a drive motor 40 that is connected to a suitable power supply 42, the power supply in the present instance being a D-C one and therefore illustrated as a battery. In order to adjust the speed at which the dirve motor 40 operates, a rheostat 44 having a resistance 46 and a wiper arm 48 is used. It will be appreciated that the amount of resistance introduced into the circuit can be determined by the particular rotative position of the wiper arm 48. The manner in which the wiper arm 48 is angularly adjusted will be more fully described below.

My load control system has been indicated generally by the reference numeral 50. The system includes a motor 52 for operating the rheostat 44, more specifically, the wiper arm 48 thereof. In order to allow the rheostat motor 52 to rotate in either direction, it is equipped with a forward winding 54 and a reverse winding 56. Consequently, when the rheostat motor 52 operates in a forward direction due to the energization of its winding 54, the amount of resistance of the rheostat 44 will be decreased with the result that the speed of the conveyor drive motor 40 increases, when the rheostat motor 52 is operated in a reverse direction owing to energization of its winding 56, then the amount of resistance supplied by the rheostat 44 can be deemed to increase with the result that the speed of the motor 40 is decreased. In this way, the quantity of rock or ore 38 delivered to the crusher 10 is adjusted to suit the particular conditions to which the crusher 10 and its drive motor 28 are subjected.

Describing the control system 50 still further, it will be seen that the rheostat motor 52 is energized from a controller 58. This controller may be of the type more fully described in my patent application for Integrating Controller, Ser. No. 321,870, filed Nov. 6, 1963, now Patent No. 3,286,144. It will be appreciated, though, that the controller 58 is capable of adjusting the rheostat motor 52 in order to vary the rate of rotation of the feed motor 40.

The manner in which controller 58 receives the appropriate signals for influencing the adjustment of rheostat motor 52 will now be explained. First it should be noted that the schematic includes a low voltage direct current power supply 60 having leads or connections 62 and 64 to which two potentiometers 66 and 68 are connected, the potentiometer 66 furnishing a relatively low set-point voltage and the potentiometer 68 furnishing a relatively high set-point voltage. It should also be noted that the negative lead 64 of this supply is also connected to the negative output lead of a power level transducer 70. The power level transducer 70 is a conventional industrial power measuring device such as the Esterline Angus Model 4986 watt transducer, shown in their Catalog #6412. The transducing device 70 receives as its input the value of the three-phase voltage being supplied to motor 28 on wires 30a, 30b and 30c and also a representation of the motor current as supplied from a current transformer 72 in wire 30a and current transformer 74 in wire 30c. It produces as its output a low voltage D-C signal representative of the instantaneous value of power being taken by motor 28 from the three-phase source 32. This signal is instrumental in both advising the controller 58 of the present level of power being drawn by the motor, and through the medium of an amplifier, shown in block form at 76, providing power to a relay 78 in the event the power level exceeds some preestablished threshold. The exact level at which this occurs may be varied by adjustment of the gain of the amplifier 76.

Considering now the use of the power level signal as applied to the controller 58, it is to be noted that the positive lead from the power transducer 70 is shown as wire 80 and connects to one of two input terminals to the controller. The other input terminal receives wires 82 which is connected to one or the other of the sliders or wipers 84 or 86 of potentiometers 66 and 68, respectively. It will be noted that due to the connection of the two negative terminals together via a wire 88, the resulting voltage applied to wires 80 and 82, and applied to the controller 58 will be the difference between the value established between wire 64 and the slider 84 or 86 of the connected potentiometer 66 or 68 and the value existing at the output terminals of the watt transducer 70 due to the power taken by the crusher motor 28. The exact values of these voltages are selected so that when the crusher motor power level has the particular value defined by the setting of the connected potentiometer slider, whether 84 or 86, the resulting voltage difference applied to the controller 58 will be zero.

This voltage is termed the error voltage, and is designated by a bracket 90 embracing wires 80 and 82. When the crusher power is not exactly that represented by the voltage from the portion of the connected potentiometer 66 or 68, as the case may be, the error voltage will have a sign and magnitude proportional to the deviation of the motor power level from the value so specified. In response to this applied error voltage, the controller 58 applies energy periodically to the forward or reverse control windings of motor 52 as previously noted. The duration of the energization of either winding 54 or 56 of motor 52 will be in proportion to the time integral of the error voltage as is more fully described in the previously-mentioned Patent No. 3,286,144.

The consequence of these energy applications to the rheostat motor 52 will be to progressively increase or decrease the amount of feed being delivered by conveyor 34 to the crusher 10 until the power taken by the crusher motor 28 is in agreement with that specified by the voltage across the connected potentiometer; the connected potentiometer will be that designated 68. A relay 92 will maintain this connection through its normally closed contacts 94 until the relay 92 becomes energized. This potentiometer is the one deliberately set to provide representation of a higher-than-desirable crusher motor power level. In responding to this error voltage, the feed applied via conveyor 34 will increase repeatedly; however, at some point determined by the characteristics of amplifier 76 and relay 78, normally open contacts 96 on this relay will close due to the instantaneous power level to the crusher motor 28 exceeding the value at which this event is chosen to occur. This contact closure, referring to the contacts 96, provides a circuit between wires 98 and 100 to energize an indicating lamp 102 from a single phase A-C supply 104, and via a diode 106 to pass the positive half cycles to the coil of relay 92 to energize it and thus open its contacts 94 and to close its normally open contacts 108 and its normally open contacts 109. A diode 110 permits the current flow to continue due to self induction in the relay coil during the negative half cycles.

Alternatively, a condition may result from the increases of feed rate to the crusher 10 where the crusher begins to fail to pass the rock 38 as rapidly as it is being supplied, although the electrical power level has not yet reached the value at which relay 78 operates. In this instance, a switch 112 comprised of a pendant contacting member 114 will be displaced by the overflowing rock, and will complete a circuit between the crusher housing 12 and wire 116. This circuit permits the energization of an indicating lamp 118 from the single phase supply 104, and via a diode 120 energizes the coil of relay 92 in the same manner as was the case when relay 78 operated.

Regardless of which means provided the initial energy for relay 92, it will remain in its energized state by the closure of its contacts 108 which provide a continuing circuit through a diode 122 and the normally closed contact 124 of a timer 126 from the single phase A-C supply 104. However, once each revolution of a cam 128, when its projecting lobe 130 interrupts the circuit by opening contact 124, the relay 92 will be de-energized, and will remain so after the timer contact 124 recloses until a recurrence of either of the two described initiating events.

The timer 126 is a conventional A-C synchronous motor driven cam operated contacting device having hysteresis synchronous motor 132 operating a shaft 134 carrying the cam 128. It is only necessary for the practicing of my invention that the timer 126 operate continuously so as to interrupt the circuit maintaining the energy to the coil of relay 92 once each revolution. Each time this timer contact 124 so operates, the contacts 94 reconnect the slider 86 of potentiometer 68 into the control circuit to require that the controller 58 attempt to produce sufficient material delivery into the crusher to satisfy the higher of the two electrical power selections.

With the foregoing information in mind, it is believed that the benefits to be derived from a practicing of my invention can better be appreciated from a brief operational sequence. Since the setting of the wiper or slider 86 on the potentiometer 68 has been selected for the purpose of deliberately inducing the operation of the motor 28 at an excessive level which if continued would cause damage to such motor, it will be appreciated that the signal forwarded to the controller 58 demands that a relatively large amount of stock in the form of rock or ore 38 be supplied to the crusher 10. This condition results in the forward winding 54 being energized so that the rheostat motor 52 rotates in the direction to decrease the amount of resistance supplied by the rheostat 44. This causes the motor 40 to increase its rate of speed and thereby deliver in a greater quantity the rock or ore from the hopper 36 to the crusher 10.

However, when some maximum power level is experienced by the crusher drive motor 28, the relay 78 is energized closing the contacts 96 so as to not only light the signal lamp 102, but with the consequence that the relay 92 is energized. While the initial electrical path is as above described, it will be appreciated that the normally open contacts 108 become energized to seal or hold in the relay 92 once an initial electrical path has been established through the switch 96. Of course, this can only happen when the switch contact 124 that is actuated by the timer motor 132 is closed, but this switch contact 124 is intended to be opened for only a very short interval once in every two or three minutes by the cam 128. In other words, the contact 124 is for the most part closed, but, as indicated, is opened periodically to break the circuit through the relay 92.

Continuing the operational description on the basis that a heavy electrical load has been experienced by the motor 28, it will be recognized that the normally open contacts 109, which when relay 92 becomes energized become closed, connect the potentiometer 66 into the system. It will be recalled that the potentiometer 66 represents the lower set-point voltage and consequently a signal is delivered to the controller 58 calling for a lower operating power level which causes the reverse winding 56 to be energized. This, in turn, causes the rheostat motor 52 to rotate in a direction to increase the resistance of the rheostat 44 to whatever extent is necessary to decrease the amount of rock or ore 38 being delivered to the crusher 10. A decrease in the amount of stock being fed to the crusher 10 will result in a decrease in the mechanical load imposed upon the crusher and a corresponding decrease in the electric power requirements of the drive motor 28 for the crusher 10. In this way, the error signal, being the difference between the set-point voltage supplied by the potentiometer 66 output of the watt transducer 70, is decreased and ultimately approaches zero.

However, in the preferred form of my invention, the interval between successive operations of the timer contact 124 is made sufficiently short so that before the error is completely reduced to zero by the reduction of material input rate into the crusher as has just been described, the set-point voltage being provided to the controller is again changed by the release of relay 92 whereupon its contacts 94 are closed and the system returns the higher set-point voltage from the wiper 86 of potentiometer 68 to the input terminals of the controller 58. Thus, before the controller has had sufficient time to reduce the material input to a condition of equilibrium, it is again called upon to increase the material feed rate, and in due course, this increase produces a recurrence of the same or a different limiting condition, there being two kinds illustrated in the example shown.

Thus, the present invention maintains the operating power level at or near the higher of the two set-points provided by the potentiometers 66 and 68. Stated somewhat differently, the load control system as envisioned by the present invention causes the load device to operate intermediate the two set-points furnished by these two potentiometers. Nonetheless, the system is responsive to the occurrence of a constraining condition, whether imposed by the closure of the switch 96 or the closure of the switch 112. In other words, the set-point of the controller 58 is supplied with a pulse-duration modulated form of set-point input whose average value corresponds almost exactly to the maximum power level at which the crusher 10 can be operated owing to the presently existing condition of its crushing surfaces and the crushability of the feed material 38.

To further explain the effectiveness of the invention, it can be assumed that initially the crusher 10 has been operating at or near the lower of the two set-points, but that the set-point to the controller 58 is now swiched to the one provided by the potentiometer 68. In repeatedly increasing the amount of feed stock, the controller 58 produces an actual operating power level having a rising value with time. However, as soon as the first constraining condition registers in the system, the lower of the two set-points obtains for the remainder of the timer cycle and the actual operating power level takes on a falling value with time. The slope of these rising and falling power levels is influenced by the speed of response of both the controller and the associated physical devices. Nevertheless, when the constraint is reached early during each timer cycle, then the average value of the set-point voltage will be lower than if the constraint is reached later in the cycle. The limiting conditions are, of course, when the constraining condition is never reached, and the system operates continually at the higher of the two set-points, this being at the set-point provided by the potentiometer 68, or when the constraint is reached almost immediately after the timer contact 124 has been closed and the system then functions continually at the lower of the two set-points, this being the set-point furnished by the potentiometer 66. Neither condition, admittedly, makes full use of the self-regulating property of the system and would suggest that in the former case the upper set-point level be raised because it has been chosen to be too low a value, and in the latter case that the lower set-point has been chosen as too high and should be lowered. The effect of the foregoing is therefore to provide an average value of set-point voltage which is applied to the controller 58 via the potentiometers 66, 68 which is reduced toward the set-point voltage of the potentiometer 66 in inverse proportion to the time interval between operation of the switch contact 124 of the timer 126 and operation of the detecting means, more specifically, the relay 78 and, of course, the transducer 70 associated therewith, or the switch 112, the average value being equal to the set-point voltage of the potentiometer 66 when the switch contact 124 is operated immediately, that is when said tmie interval approaches zero.

While it has been explained that either the switch 112 or the switch 96 can initiate a change from the control provided by the potentiometer 68 to the control provided by the potentiometer 66, it will be recognized that any additional number of such contacts may be incorporated into the system dependent upon the number of constraints or limiting conditions to which the system should be responsive. It is only necessary that these limiting conditions cause operation of the relay 92 and therefore any number of parallel paths can be resorted to, only two having been described. It should be further noted that the circuit provides for suitable isolations between the indicators 102 and 118, and similar indicators that may be provided for additional limiting condition detectors so that each is extinguished as soon as the limiting condition ceases despite the fact that the control system relay 92 is retained in its energized state until the end of the period determined by the continuously running timer 126. Furthermore, as far as either the switches 112 or 96 are concerned, a time delay, say, of from 2 to 5 seconds can be required before these switches close, thereby introducing a delay of whatever magnitude best suits the circumstances at hand.

It will, of course, be understood that various changes may be made in the form, details, arrangements and proportions of the parts without departing from the scope of my invention as set forth in the appended claims.

I claim:

1. In a control system for a load device having first and second states of operation, said first state being acceptable for continuous operation of said device and said second state being acceptable for only short periods of operation, means for determining when said second state is reached, means responsive to said determining means for initiating a change from said second state toward said first state, and means for periodically interrupting the action of said responsive means to permit return to said second state of operation.

2. In a control system for a load device capable of operating continuously at one load level and for short intervals at a higher load level, means for sensing when said higher load level exists, means responsive to said first means for reducing the load level when said higher load level is reached, and means for inactivating said responsive means and thus permitting return to said higher load level after a period of time has elapsed, whereby an average load level intermediate said one load level and said higher load level can be maintained.

3. In a control system for a load device capable of operating continuously at a relatively low load level and intermittently at a relatively high load level, means for sensing when said relatively high load level is reached, means responsive to said sensing means for causing operation of said device to a load level below said high load level, and means for periodically rendering said last-mentioned means ineffectual to permit operation of said device at a load level above said relatively low load level until said relatively high load level is again reached.

4. In a control system for an electric motor capable of operating continuously at one power level and capable of operating for short periods at a higher power level, means for sensing when said higher power level is reached, means capable of maintaining either of said power levels, means responsive to said sensing means for causing said maintaining means to become effectual at the said one power level only when said higher power level is reached, and means for periodically inactivating said responsive means and thus allowing said maintaining means to return to said higher power level, whereby said sensing means causes a shift toward said one power level if said higher power level recurs.

5. In a control system for an electric motor capable of operating continuously at a lower power level and for short periods at a higher power level, a first potentiometer for instructing said electric motor to operate at its said lower power level, a second potentiometer for instructing said electric motor to operate at said higher power level, means for determining when said high power level is reached when said motor is being instructed by said second potentiometer, means responsive to said determining means for switching from said second potentiometer to said first potentiometer, and timing means for periodically returning to said second potentiometer, and thereby supply instruction for operation of said electric motor at a power level having an average value between said higher and said lower power levels.

6. In a control system for an electric motor, means responsive to a limiting condition that is to be avoided for protracted intervals, a first potentiometer for causing said motor to be subjected to a condition of lesser severity than said limiting condition, a second potentiometer for allowing said motor to be subjected to said limiting condition, means actuated by said responsive means for switching control of said motor from said first potentiometer to said second potentiometer, and a continuously operated timer for periodically returning control of said motor from said first potentiometer to said second potentiometer, whereby operation of said motor is then continued under the influence of said second potentiometer unless said limiting condition recurs.

7. In a control system for a motor-operated crusher, variable means for feeding stock to said crusher, first means for causing said stock feeding means to deliver stock at a slower rate, second means for causing said stock feeding means to deliver stock at a faster rate, means responsive to a limiting condition of crusher operation that is to be avoided for protracted intervals, means controlled by said last-mentioned means for switching operation from said second means to said first means to reduce the rate of stock feeding when said limiting condition is sensed, and means for periodically returning control of said stock feeding means to said second means.

8. In a control system for a crusher having an electric motor for operating same, means for feeding stock to said crusher having an electric motor for operating same, a first potentiometer for causing operation of said second motor at a relatively low speed so as to feed stock to said crusher at a reduced rate, a second potentiometer for causing operation of said second motor at a relatively high speed so as to feed stock to said crusher at an increased rate, a relay having a first normally open contact in circuit with said first potentiometer and a normally closed contact in circuit with said second potentiometer, a normally closed contact in circuit with said relay, a timer motor for periodically opening said last-mentioned contact, said relay having a third normally open contact in series with said last-mentioned contact, and means responsive to a limiting condition of crusher operation for energizing said relay to shift control of said second motor from said second potentiometer to said first potentiometer when said limiting condition is reached, said third contact maintaining said relay energized until opening of said timer-operated contact causes de-energization of said relay and reclosure of its said normally closed contact.

9. In combination with a crusher and a feeder for delivering stock thereto, a load control system comprising first means responsive to a limit condition of crusher operation that should not continue, second means for controlling said feeder at a rate to allow said limit condition to occur, third means for controlling said feeder at a rate so as to prevent said condition from occurring, a relay operated by said first means for switching from said second means to said third means when said limit condition exists, and timer means for rendering said relay inoperative at periodic intervals to switch back to said third means, whereby said feeder operates under the influence of said third means if said limit condition no longer exists.

10. A load control system comprising first means responsive to a limit condition that should not continue, second means controlled by said first means for initiating an action to reduce the severity of said limit condition, third means for periodically interrupting the action of said second means to allow return to said limit condition, whereby said second means will again act to reduce the severity of said limit condition if still present or if said limit condition should recur.

11. In a control system for a load device, a controller for modifying the load to which said load device is subjected, means for applying a relatively low first set-point voltage to said controller representative of a condition of said load device that can be continued for protracted intervals, means for applying a relatively high set-point voltage to said controller representative of a limiting condition that is too high for continued operation of said load device, means for periodically transferring said controller to said second set-point means, means for detecting when a limiting condition occurs, and means responsive to said detecting means for transferring said controller to said first set-point means, whereby the average value of set-point voltages applied to said controller is reduced toward said first set-point voltage in inverse proportion to the time interval between operation of said periodic transferring means and operation of said detecting means, said average value being equal to the value of said first set-point voltage when said time interval approaches zero.

12. In combination with a crusher having an electric motor for operating same and a feeder having a second electric motor for operating same, a control system comprising a controller for changing the rate of speed of said second motor to thereby change the load to which said crusher is subjected, first potentiometer means for applying a relatively low set-point voltage to said controller for causing said second motor to operate at a relatively low rate of speed to decrease the quantity of stock being supplied to said crusher, second potentiometer means for applying a relatively high set-point voltage to said controller for causing said second motor to operate at a relatively high rate of speed to increase the quantity of stock being supplied to said crusher, means for periodically transferring said controller to said second potentiometer means, means for detecting when said crusher has been subjected to a maximum load condition, means responsive to said detecting means for transferring said controller to said first potentiometer means, whereby the average value of set-point voltage applied to said controller is reduced toward said first set-point voltage in inverse proportion to the time interval between operation of said periodic transferring means and operation of said detecting means, said average value being equal to the value of said first set-point voltage when said time interval approaches zero.

13. The combination set forth in claim 12, in which said detecting means includes a power level transducer connected in circuit with said first electric motor.

14. The combination set forth in claim 12, in which said detecting means includes a switch disposed in said crusher operable when the level of stock reaches a predetermined level in said crusher.

15. In a control system in which a first operating condition is acceptable for relatively long periods and in which a second operating condition is to be avoided for relatively long periods, means for determining when said second condition is reached, means responsive to said determining means for initiating a change which if continued will result in a shift toward said first condition, and means for intermittently inactivating said responsive means irrespective of whether an actual shift towards said first condition has occurred.

16. In a control system for a machine having a first operating state that is acceptable and second operating state that is unacceptable, first means for normally causing said machine to operate in the direction of said second state, second means for sensing when said second state is reached, means controlled by said sensing mean for causing said machine to operate in the direction of said first state when said second state is reached, and means for periodically interrupting the last-mentioned means so that said first means again causes said machine to operate in the direction of said second state and until said second state is again reached.

17. In a control system for a machine operable between first and second states, first means capable of causing said machine to alter its operation and to approach said second state, second means capable of causing said machine to alter its operation and to approach said first state, third means for normally activating said first means and inactivating said second means to cause said machine to approach said second state, fourth means for determining when said second state is reached and then controlling said third means to inactivate said first means and to activate said second means to cause said machine to approach said first state, and fifth means for peridically inactivating said fourth means so that said third means again activates said first means and inactivates said second means irrespective of whether said second state is still present.

References Cited

UNITED STATES PATENTS

| | | | |
|---|---|---|---|
| 2,843,327 | 7/1958 | Nickle | 241—35 |
| 3,157,365 | 11/1964 | Brown et al. | 241—35 |
| 1,599,593 | 9/1926 | Smith | 241—35 |
| 3,078,051 | 2/1963 | Pallerson | 241—35 |
| 3,269,527 | 8/1966 | Denham | 241—35 |

ROBERT C. RIORDON, Primary Examiner

D. D. EVENSON, Assistant Examiner

U.S. Cl. X.R.

318—39, 77